INVENTORS
NEIL J. NORMANDO
WILLIS C. PIERCE, JR.
BY
Frances B. Henry
ATTORNEY

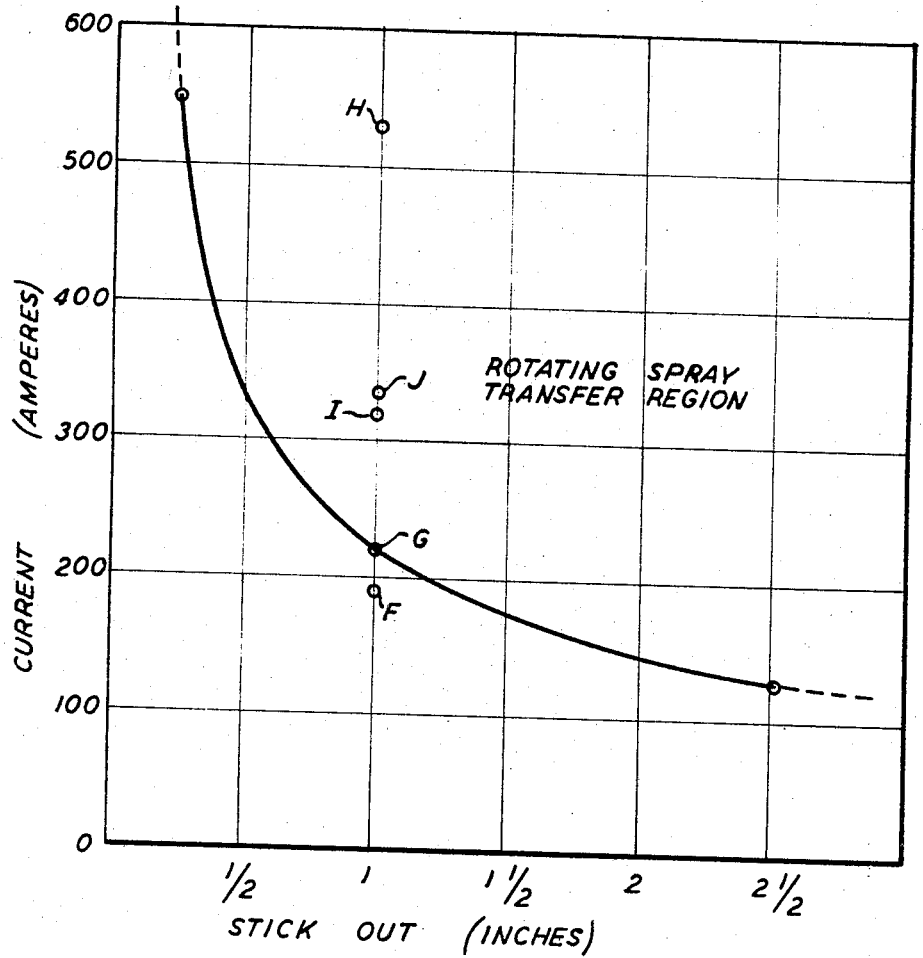

United States Patent Office 3,475,586
Patented Oct. 28, 1969

3,475,586
ARC WELDING
Neil J. Normando, Livingston, and Willis C. Pierce, Jr., Murray Hill, N.J., assignors to Air Reduction Company, Incorporated, New York, N.Y., a corporation of New York
Filed Aug. 18, 1966, Ser. No. 574,277
Int. Cl. B23k 9/10
U.S. Cl. 219—131                    9 Claims

ABSTRACT OF THE DISCLOSURE

A method of increasing the melting rate of a consumable arc welding electrode by imposing a pulsed current on a normal reversed polarity direct current to obtain axial transfer of well metal from the electrode to a workpiece at effective current levels which heretofore resulted in rotating-spray transfer.

---

This invention relates to an improved apparatus and method of arc welding in which the energy input to the consumable electrode is controlled in a manner which results in a greatly improved weld, characterized by a greater deposition rate, improved penetration and uniformity. In order to achieve the improved results, it has been found that the energy input must comprise at least in part a pulsing current, the characteristics of which will be more fully discussed below.

The phenomena of "axial spray metal transfer" was first disclosed in the U.S. Letters Patent No. 2,504,868 to Albert Muller, Glenn J. Gibson, and Nelson E. Anderson, granted Apr. 18, 1950. Briefly, the transfer may be described as "a visible spray of fine discreet droplets" within a gas shield which is projected from a wire electrode to the workpiece. In that patent, an inert monatomic gas shield and a direct current of reversed polarity were utilized. Low current reverse-polarity welding arcs are characterized by a globular transfer of metal from the electrode by gravity. A gradual increase in the welding current causes an increase in the electrode melting rate and, at the same time, produces an increase in the rate of drop detachment from the electrode as well as a reduction in the drop size. This gradual change in drop size and frequency of transfer does not continue indefinitely. At a critical level of welding current, referred to hereinafter as the first transition current, the drop size is reduced very suddenly and the frequency of drop transfer increases considerably producing an "axial spray metal transfer" which is substantially independent of gravity. Many welding applications make use of this axial-spray transfer in that the arcs are considered more stable than those below the transition current. Furthermore, axial-spray transfer results in better weld penetration with a minimum of spatter. This same phenomena also occurs in the modifications of the Muller et al. process disclosed in Muller U.S. Patents 2,694,763 and 2,694,794 and the Lesnewich and Cushman U.S. Patent 2,932,722.

It has been discovered that if the magnitude of current and the electrode feed rate are continually increased beyond the above referred to first transition current, a second level of current will be reached beyond which the arc characteristics will again change. This second transition current is the threshold current beyond which the arc characteristics change from an axial spray transfer to a "rotating-spray" transfer. It develops at some critical value of current and, as with the transition from drop to axial spray, the current at which it occurs is dependent upon the electrode polarity, diameter, extension, composition, and activation.

In this latter condition, the tip of the electrode is caused to bend and rotate about the longitudinal axis of the body portion of the electrode. Thereafter continued increase in current will increase the angle of bend at the electrode tip until it is almost at right angles to the axis of the electrode body. In this extreme condition, the molten electrode metal is spewed in all directions and the arc is no longer useful as a tool for certain types of welding. The phenomena of rotating-spray transfer is fully disclosed in U.S. Letters Patent No. 2,916,601, Alexander Lesnewich, granted Dec. 8, 1959, for "Electric Arc Welding."

While the rotating-spray transfer of electrode metal has certain useful applications, it cannot be applied where a weld of deep penetration, high deposition rate and uniform width is desired. Even the well-known axial-spray transfer, which is achieved when a current between the first and second transition currents is utilized, has been found wanting in some respects. Primarily, the current limitations which these transition currents impose directly limit the useful welding deposition rate of the electrode metal.

We have discovered that by imposing a pulsing current on the normal reversed polarity direct current, a substantially axial metal transfer will result even when the effective welding current is above the rotating-spray transition current. The effective level of current flow through the electrode is the root mean square value of the pulsed current and the direct current. In addition to being substantially axial this transfer takes place at a high deposition rate partly due to the fact that the average welding current has been increased and partly due to the fact that the heat input to the electrode has been increased due to the current wave form factor. This form factor is the ratio of root mean square value of current to the direct current value and will be more specifically discussed below. It has been further discovered that the characteristics of the bead have been significantly improved when compared with beads obtained by non-pulsing current in the rotating-spray region. Specifically the bead uniformity and contour approaches that obtained when using lower level currents in the axial spray region. Another improved characteristic is that under certain conditions the penetration pattern does not exhibit a pronounced papillary.

It is the object of this invention to provide methods and apparatus for increasing the arc current and melting rate of a consumable arc welding electrode.

It is a further object of this invention to provide methods and apparatus for obtaining substantially axial transfer of weld metal from an electrode to a workpiece at effective current levels which heretofore would have resulted in rotating-spray transfer.

It is a further object of this invention to utilize pulsing current to achieve axial transfer in a consumable electrode arc welding system.

These and other objects and advantages of the invention will be pointed out and become apparent from the following detailed description thereof.

In accordance with the present invention, welding current is supplied to the arc in the form of pulses of a particular amplitude and average current. The use of pulsing current is not new, and reference may be had to the U.S. Letters Patent No. 3,071,680 to N. E. Anderson et al., granted on Jan. 1, 1963 for a comprehensive discussion of this concept. In the Anderson et al. device, the amplitude of the pulse current is made greater than the first transition current to thereby produce axial spray transfer of weld metal while the root mean square and average current values are less than the continuously supplied currents above the transition current which have heretofore been employed for producing an axial spray transfer of weld metal. The Anderson et al. invention effectively extends the useful range of the process of the Muller et al. patent and similar processes on the low current side.

We have discovered that by using a pulsing current, having an effective current above the second transition current, we can greatly decrease or eliminate the rotating spray effect, provide axial transfer and substantially increase the deposition rate. This invention effectively extends the useful range of the process of the Muller et al. patent and similar processes on the high current side.

This invention will be further described and explained in detail in connection wth the accompanying drawings in which:

FIGURE 3 shows a curve which illustrates the transition from axial-spray to rotating-spray;

Figure 1:
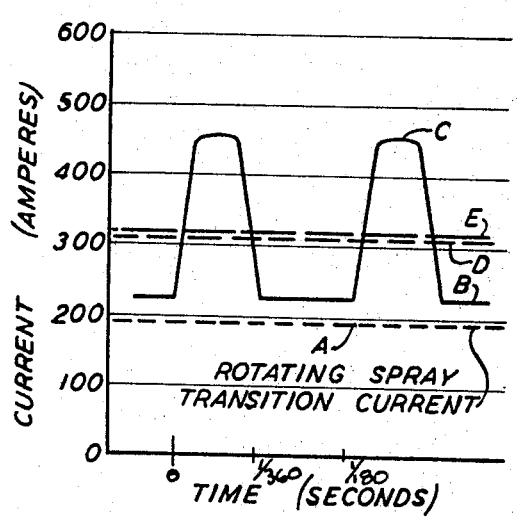
FIGURE 1 shows a typical wave shape of the pulsed current when applied in one mode of operation to an electrode having an inch and a quarter electrode extension.
Figure 2:
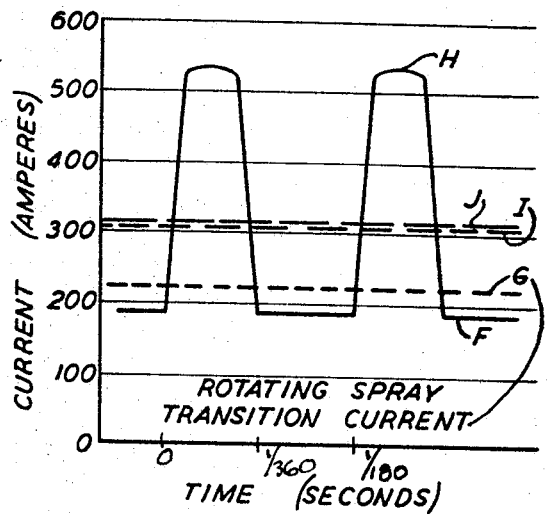
FIGURE 2 shows a typical wave shape of the pulsed current when applied in a second mode of operation to an electrode having an inch stick out.

In FIGURE 1 there is illustrated a typical current wave form when applied in a mode of operation which we will hereinafter refer to as the first mode of operation. A current wave form resulting from a second mode of operation is illustrated in FIGURE 2. Both modes of operation have been observed to give the desired results, i.e. increased penetration, greater deposition rate, and a substantially improved form of transfer. In the first mode of operation, both the base current component which is the level of current between the pulses and the peak or crest level of the pulsing current always remain within the normal rotating-spray current region. This region is of course determined by electrode polarity, diameter, extension, composition and activation as was mentioned previously. The current wave form shown in FIGURE 1 was applied while using an .035 inch diameter electrode, composed of a deoxidized mild steel wire using argon +1% oxygen at 170 c.f.h. as a shielding gas. The wire was fed at a speed of 2664 inches per minute and had a stickout of an inch and a quarter. The term stickout or electrode extension is the length of the electrode from the tip of the contact tube to the arc. The weld travel speed was 28 i.p.m. The workpieces used were 12" by 24" by 5/16" cold rolled mild steel plates which were placed on equipment which could produce the weld travel speed. The pulsing component was 180 c.p.s. half cycle current pulses. By using FIGURE 3, which indicates the rotating spray transition current for various stickout distances, we can determine that the rotating spray transition current for an inch and a quarter is approximately 190 amps. The transition current is indicated by line A in FIGURE 1. The base current level of 220 amps is plotted as line B and the peak value (460 amps) of the pulsing current is shown at C. This current wave form approximates a square wave form but this of course depends on the apparatus developing the pulsing current. The apparatus that was used to create the wave form shown in FIGURE 1 will be described below. The average current value for the wave form is plotted as line D (304 amps) and the effective or root means square value as line E (315 amps). It is apparent that the reference current B, peak current C, effective current E and average current D are all above the rotating spray threshold current A in this mode of operation. Since the rotating spray transition current was exceeded, we expected initially to obtain a rotating spray effect. When a consumable electrode is subjected to currents above the second transition current it has a tendency to slightly taper at the molten end and this end has a tendency to whip around in the manner described above and illustrated in Lesnewich Patent No. 2,916,601. This however did not occur in the manner we anticipated. By pulsing the current, the rotational effect was substantially eliminated. Ultra-slow motion pictures were taken which revealed that during each pulse a strong axial cone of metal vapor appeared from the tip of the electrode to the workpiece. No metal vapor column appeared in between the pulses. Detachment of the molten metal was observed to take place during the interval when the pulse was on. A necking down of the electrode was observed just prior to detachment. Generally, the portions discharged were found to have an elongated cylindrical appearance and were transferred axially toward the workpiece. The portions transferred were found to have an axial dimension from one to four times the wire diameter in length. Under certain conditions it has been found that the molten metal was transferred in a form having the characteristics of axial spray transfer. The geometry of the workpieces can be affected by adjusting the peak value of the pulsed current, wire feed speed, pulse duty cycle or the frequency.

The constricting or necking down phenomena which occurs just prior to detachment is very significant in that it does not occur when non-pulsing currents in the rotating-spray region are utilized. The necking down causes the molten end of the electrode to detach and be discharged toward the workpiece before it is able to rotate. We believe the necking is caused by the increase in the electro-magnetic forces on the molten end during the pulse interval. It appears from the films that the entire molten electrode segment is detached and transferred as a result of each pulse of current.

As mentioned previously, the rate of deposition is increased considerably by the use of pulsed current. This can be accounted for in part by considering the R.M.S. heating in the electrode due to the wave form modification caused by the pulse. This is discussed in the Anderson et al. patent. The change in wave form produces additional resistance heating in the electrode extension which increases the melting rate.

Figure 6:
FIGURE 6 illustrates a cross section of a weld made with non-pulsing current in the rotating-spray region.
Figure 7:
FIGURE 7 illustrates a cross section of a weld made with pulsing current applied in accordance with the principles of this invention.

We accordingly achieved a substantially axial transfer of metal, increased penetration and a higher deposition rate. In FIGURE 6 there is illustrated a cross section of a weld 10 formed by non-pulsing current having an average current level (B) maintained in the rotating-spray region. The electrode extension was an inch and a quarter. FIGURE 7 illustrates a cross section of a weld formed by the current supply illustrated in FIGURE 1. In comparing FIGURES 6 and 7, note that in FIGURE 7 greater penetration has taken place and considerably more metal has been transferred to the workpiece. These are of course extremely desirable characteristics. It is impossible to illustrate clearly in still pictures and drawings the suppression of the rotating spray effect by our use of pulsing current. Motion pictures of the operation clearly illustrate this.

The mode of operation depicted in FIGURE 2 will now be described. In this second mode, a reference current F (190 amps) was selected below the second threshold current level G (220 amps) and the peak level H (530 amps) of the pulsing current considerably exceeded the threshold current. The average current level I (320 amps) and the effective current level J (333 amps) were also located in the rotating spray range. The test was run under the following welding conditions: .035″ diameter mild steel electrode wire was used; the electrode stickout distance was one inch, wire feed speed was 1980 i.p.m.; weld travel speed was 34 i.p.m.; the shielding gas used was argon plus 1% oxygen; and 180 c.p.s. half cycle current pulses were utilized. The current values F–J are plotted in FIGURE 3 in order to clearly illustrate the relationship between the current values and the second transition current level.

Figure 4:
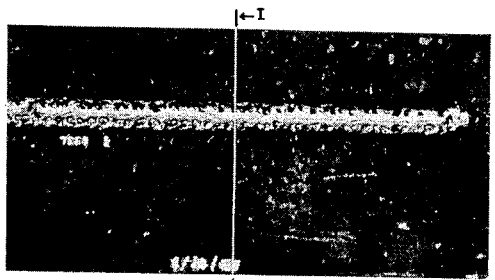
FIGURE 4 shows a plan view of a weld which was formed by non-pulsing current within the normal rotating-spray current region.
Figure 5:
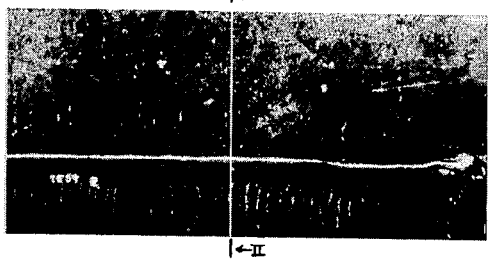
FIGURE 5 shows a plan view of a weld which was formed by pulsing current applied in accordance with the principles of this invention.
Figure 9:
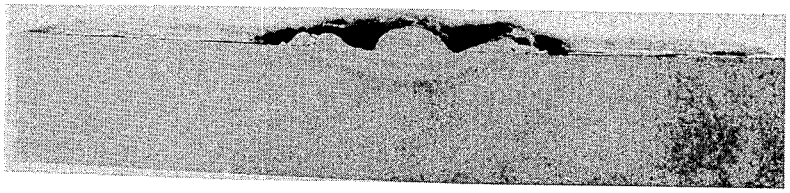
FIGURE 9 is a cross section of the weld shown in FIGURE 4, taken along line I—I.
Figure 10:
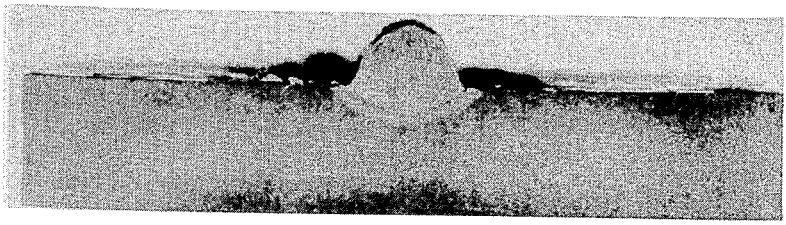
FIGURE 10 is a cross section of the weld shown in FIGURE 5, taken along the line II—II.

In FIGURE 4 there is shown a plan view of a weld made with non-pulsing current, one inch stickout and an average current of 320 amps. This is within the rotating-spray region and the effects thereof can be seen in FIGURE 4. Note the width of the weld and the non-uniformity thereof. The rotating electrode throws the melting electrode in all directions causing a porous and pock marked weld. In FIGURE 5 there is illustrated a weld made utilizing the wave form in FIGURE 2. Note the uniformity and density of the weld as compared with that shown in FIGURE 4. This is further illustrated in FIGURES 9 and 10 which are cross-sectional views of FIGURES 4 and 5 respectively. FIGURE 9 illustrates that rotating-spray causes a very wide irregular weld. FIGURE 10 illustrates a weld that has improved penetration, contour and uniformity. Note also the considerable amount of metal that has been deposited in FIGURE 10. Both of the welds were made with the same average current, the only difference being that the weld illustrated in FIGURES 5 and 10 was formed using a pulsing current as illustrated in FIGURE 2.

Of the two modes of operation illustrated in FIGURES 1 and 2, respectively, it is considered that the second mode gives a resultant weld which has slightly better characteristics that the resulting from the first mode of operation. The bead contour and penetration are somewhat improved. These better characteristics may be attributed to the fact that the electrode tip has less tendency to rotate when in the second mode of operation.

Figure 8:
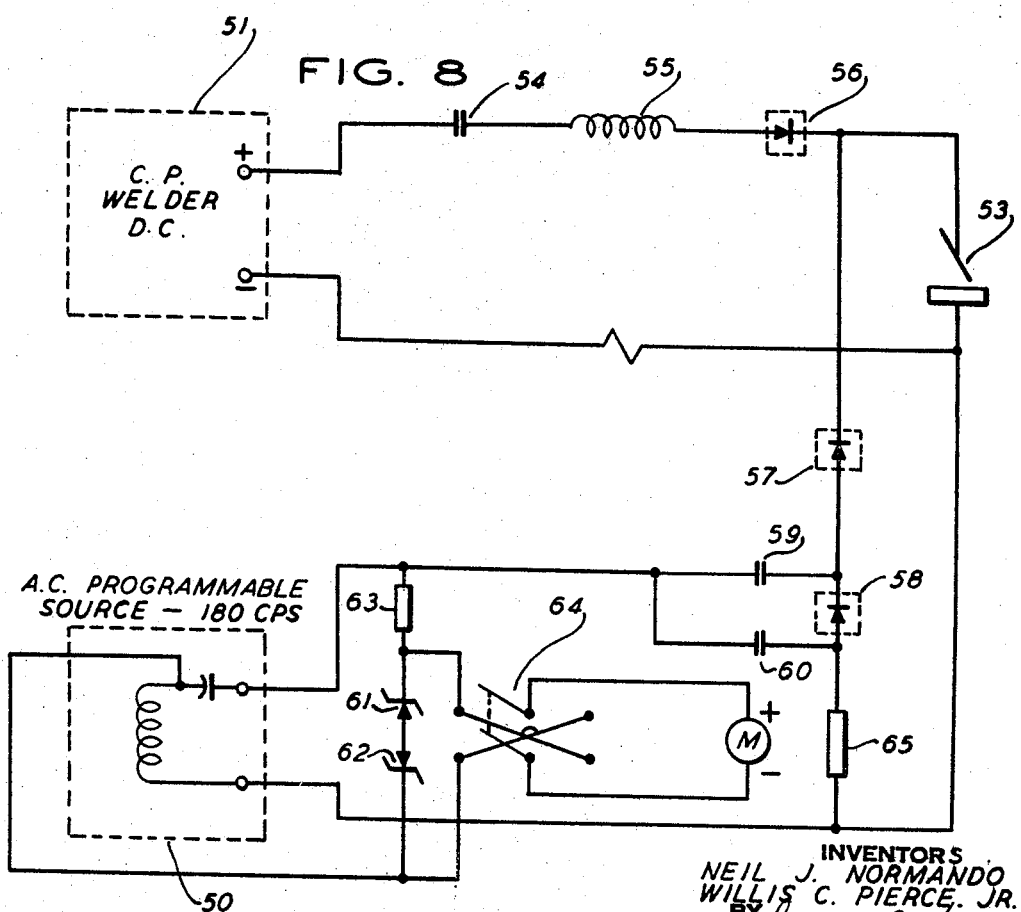
FIGURE 8 illustrates schematically in block diagram the salient components of the pulse power control apparatus for practicing the invention.

In FIGURE 8 there is illustrated in a simplified block diagram, the power supplies used to create the reference current and superimposed pulsed current. We welded successfully using a reference current source capable of maintaining an arc with 300 amps and 40–45 arc volts. The pulse current source was capable of delivering 300 amperes to an arc with 40–45 load volts between pulsing intervals. The characteristics of the power supplies must be determined in relation to the diameter of the electrode and all the other factors which affect arc characteristics and metal transfer.

Inasmuch as arc rotation speeds in the neighborhood of 24,000 r.p.m. have been observed, we have determined that the pulse repetition rate should be relatively high in order to effectively "break-up" the molten arc column. We have successfully welded using 60 cycle although the total arc column was not as well defined as when 180 cycle was used. In FIGURE 8 there is shown a constant potential direct current welding power source 51 and an alternating current programmable source 50 connected in parallel across an arc 53. In order to insure electrical compatibilty with the AC source, certain elements are placed in the DC circuit. These include a welding contactor 54, to allow interruption of the welding current, a choke 55 to provide voltage during the pulse intervals so that the pulse voltage will not back bias the DC source and a series diode 56 on a heat sink to prevent the high open circuit voltage of the AC supply from damaging the DC supply.

The pulse current source is a 180 cycle AC source 50 with its output half wave rectified. Inasmuch as internal blocking capacitors were built into this power source for use in other applications, it was necessary to provide a dummy load for the negative half of the AC cycle to prevent the accumulation of charge on the capacitors. This is shown in the schematic as diodes 57, 58 mounted on heat sinks and contactor 59. Contactor 60, two Zener diodes 61, 62 a 2000 ohm resistor 63, a toggle reversing switch 64 and a 0–25 v. DC meter were added for the purpose of adjusting the load bank 65 and measuring the accumulated DC charge.

Any suitable AC power supply may be coupled with the usual constant potential DC welding source to create the desired pulses. Furthermore, suitably arranged DC sources could be used to provide the pulsating currents, the circuit illustrated in FIGURE 8 being merely illustrative of one of many suitable setups. The practice of this inventive process does not depend on whether the reference current and the pulsing current are alternately applied or supplement one another.

Furthermore it is quite obvious that the wave shape of the pulsed currents may be variously modified and that the invention is not limited to welding with full half cycles of alternating current as mentioned above. Similarly, the frequency may be altered dependent on the type and size of wire to be used.

A conventional shielding gas nozzle and supply system were used during the above described welding operations. It is not considered necessary to describe in detail this system in that it is well known in the art, as illutsrated in any of the above mentioned patents.

From the foregoing it is clear that the practice of this invention encompasses the substantial elimination of the rotating spray effect while retaining effective currents above the rotating spray transition current. The invention may therefore be applied to any type of electrode material which exhibits rotating spray characteristics at a critical value of current (rotating spray transition current).

Thus, while the invention has been above described as being performed by the apparatus described, it is apparent that this apparatus may be variously modified and that other forms of apparatus may be employed for producing the pulsed current flow used in practicing the invention. Other substitute arrangements will occur to those skilled in the art in view of the above description of this invention, and it is therefore intended that the appended claims cover all such modifications which fall within the true spirit and scope of this invention.

What is claimed is:

1. In the practice of high current density arc welding wherein at steady DC welding current values above a transition value the molten drops of metal released from a consumable electrode suddenly change from an axial-spray transfer to a rotating-spray transfer from the electrode to a workpiece, the method of obtaining substantially axial transfer at average welding current values above said transition value which comprises supplying through said electrode to the welding arc pulses of current which are spaced from one another in time of occurrence and which have peak values greater than said transition value of current.

2. In the practice of high current density arc welding wherein at steady DC welding current values above a transition value the molten drops of metal released from a consumable electrode suddenly change from an axial-spray transfer to a rotating-spray transfer from the electrode to a workpiece, the method of obtaining substantially axial transfer at average current values above said transition value which comprises supplying through said electrode to the welding arc a reference current and a pulsating current having peak values greater than said transition value of current.

3. The method according to claim 2 in which the reference current supplied lies above the transition value of current.

4. The method according to claim 2 in which the reference current supplied lies below the transition value of current.

5. The method according to claim 2 in which the reference current is sufficient to maintain the arc and cause a transfer of metal from said electrode to said workpiece.

6. In the practice of high current density arc welding wherein at steady DC welding current values above a first transition value the molten drops of metal released from a consumable metal electrode suddenly increase in number with a concurrent reduction in their size to produce an axial-spray transfer of metal from the electrode to a workpiece and wherein at steady DC welding current values above a second transition value greater than said first, the molten electrode tip begins to rotate causing a rotating-spray transfer of metal from the electrode to the workpiece, the method of obtaining substantially axial transfer of electrode material at average welding currents above said second transition value which comprises supplying through said electrode to the welding arc, pulses of current having peak values above said second transition value.

7. A welding method according to claim 6 characterized by supplying a reference current to said electrode to maintain the arc.

8. A welding method according to claim 7 in which the reference current supplied lies below the second transition value.

9. A welding method according to claim 7 in which the reference current supplied lies above the second transition value.

References Cited

UNITED STATES PATENTS

| | | | |
|---|---|---|---|
| 3,071,680 | 1/1963 | Anderson et al. | 219—131 |
| 3,361,892 | 1/1968 | Spencer | 219—131 |

JOSEPH V. TRUHE, Primary Examiner

C. L. ALBRITTON, Assistant Examiner

PO-1050
(5/69)

UNITED STATES PATENT OFFICE
CERTIFICATE OF CORRECTION

Patent No. 3,475,586      Dated October 28, 1969

Inventor(s) N. J. Normando and W. C. Pierce, Jr.

It is certified that error appears in the above-identified patent and that said Letters Patent are hereby corrected as shown below:

Column 4, line 34, correct the word "workpieces" to read

-pieces-

Column 5, line 39, before the word "that" insert the word

-than-

Column 5, line 39, delete the first "the"

SIGNED AND
SEALED
MAY 26 1970

(SEAL)
Attest:

Edward M. Fletcher, Jr.
Attesting Officer

WILLIAM E. SCHUYLER, JR.
Commissioner of Patents